(12) United States Patent
Mohanraj et al.

(10) Patent No.: US 12,732,829 B2
(45) Date of Patent: Sep. 8, 2026

(54) METHOD AND SYSTEM FOR SELECTING THE LOCATION FOR AN ACCESS POINT IN A DWELLING

(71) Applicant: DISH Network Technologies India Private Limited, Bengaluru (IN)

(72) Inventors: Hariprasanth Mohanraj, Bengaluru (IN); PraveenKumar G, Bengaluru (IN); Vikram Balaraja Shetty, Bangalore (IN); Mansoor Ahmed, Bangalore (IN); Manigandan Subramani, Bangalore (IN)

(73) Assignee: DISH Network Technologies India Private Limited, Bengaluru (IN)

( * ) Notice: Subject to any disclaimer, the term of this patent is extended or adjusted under 35 U.S.C. 154(b) by 379 days.

(21) Appl. No.: 18/359,613

(22) Filed: Jul. 26, 2023

(65) Prior Publication Data

US 2025/0039683 A1 Jan. 30, 2025

(51) Int. Cl.
*H04W 16/20* (2009.01)
*H04W 84/12* (2009.01)

(52) U.S. Cl.
CPC ............ *H04W 16/20* (2013.01); *H04W 84/12* (2013.01)

(58) Field of Classification Search
CPC ...... H04W 16/20; H04W 84/12; H04W 16/18
See application file for complete search history.

(56) References Cited

U.S. PATENT DOCUMENTS 6,304,754 B1 * 10/2001 DeSantis ............... H04W 16/18 455/457
10,108,755 B2 * 10/2018 Flynn ...................... G06F 30/13
2011/0201360 A1 * 8/2011 Garrett .................. H04W 4/029 455/457
2012/0259595 A1 * 10/2012 Narita .................... G06Q 10/06 703/1
2015/0257014 A1 * 9/2015 Ahmed ................. H04W 4/021 370/255
2016/0353309 A1 * 12/2016 Gunnarsson ........ H04W 72/542
2017/0374560 A1 * 12/2017 Judge .................... H04W 16/20
2018/0197188 A1 * 7/2018 Halstead ........... G06Q 30/0201

(Continued)

FOREIGN PATENT DOCUMENTS

CN 1446335 A * 10/2003 ............. H04B 17/23
CN 1951067 A * 4/2007 ........ H04W 28/0861
WO WO-2018060058 A1 * 4/2018 ............ H04W 24/02

*Primary Examiner* — Charles T Shedrick
(74) *Attorney, Agent, or Firm* — Seed Intellectual Property Law Group LLP

(57) ABSTRACT

According to one embodiment, an apparatus of determining a preferred location for a Wi-Fi access point in a dwelling is provided. This apparatus includes a memory having stored therein dwelling data that includes a layout for a plurality of dwellings and expected Wi-Fi propagation data for each respective dwelling stored in the database. A user inputs data to client device regarding the location of a selected dwelling. A computer processor in the client device receives the input data regarding the selected dwelling and performs the steps of: comparing the input data with the stored dwelling data; outputting results of a comparison of the input data and the stored dwelling data for viewing by a user; and outputting a recommended Wi-Fi access point setup location in response to the user requesting a recommendation.

20 Claims, 9 Drawing Sheets

(56) References Cited

U.S. PATENT DOCUMENTS

| | | | | |
|---|---|---|---|---|
| 2019/0052523 | A1* | 2/2019 | Jawaharlal | H04L 63/107 |
| 2019/0182678 | A1* | 6/2019 | Kikinis | H04W 16/20 |
| 2021/0160701 | A1* | 5/2021 | Felt | G06Q 30/0601 |
| 2025/0039683 | A1* | 1/2025 | Mohanraj | H04W 16/18 |

* cited by examiner 116
314
IMAGE SENSOR
NETWORK INTERFACE
302
304
PROCESSOR
306
POWER SUPPLY
312
MEMORY
310
DISPLAY

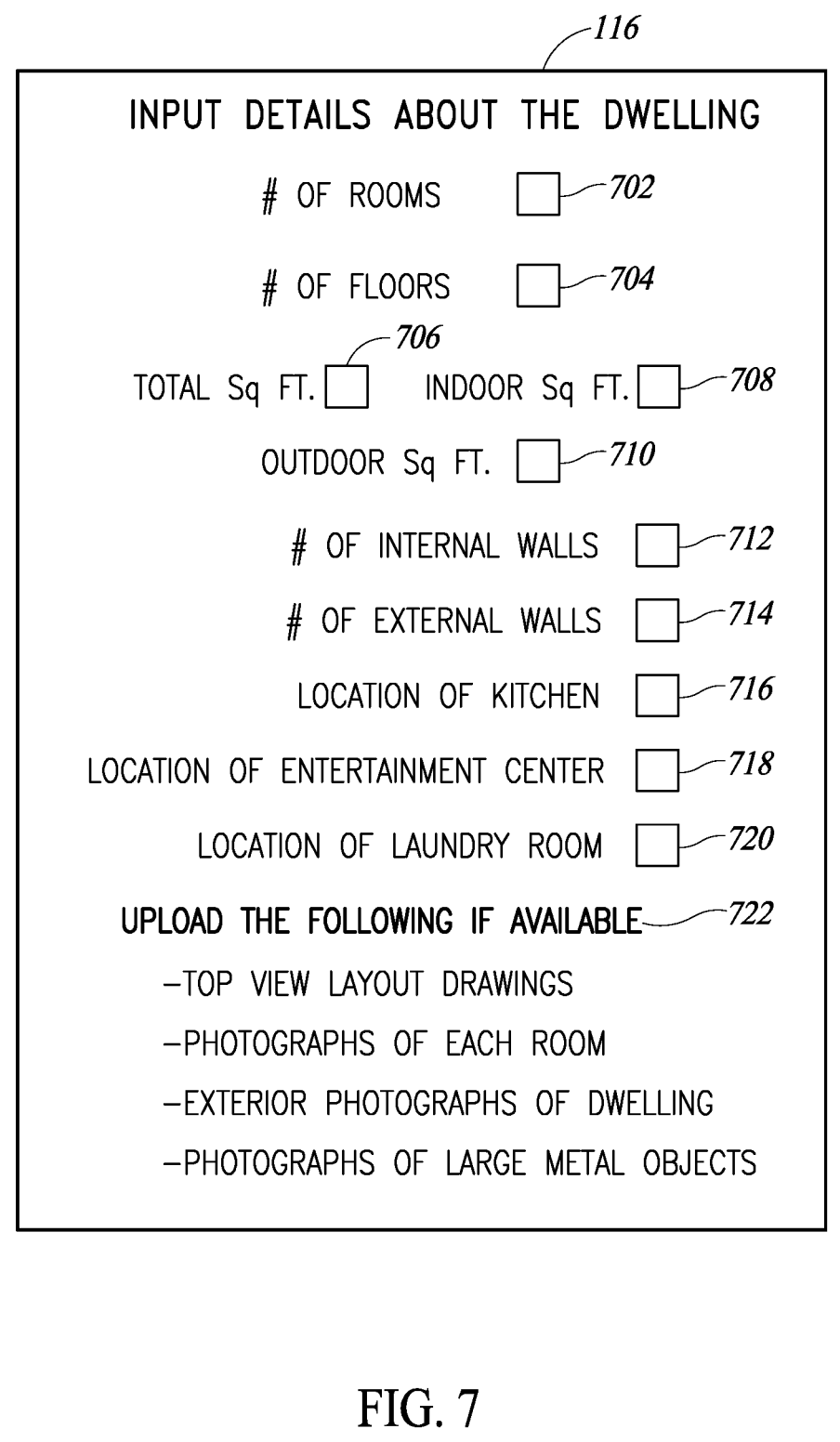

INPUT DETAILS ABOUT THE DWELLING

OF ROOMS 702

OF FLOORS 704

TOTAL Sq FT. 706 INDOOR Sq FT. 708

OUTDOOR Sq FT. 710

OF INTERNAL WALLS 712

OF EXTERNAL WALLS 714

LOCATION OF KITCHEN 716

LOCATION OF ENTERTAINMENT CENTER 718

LOCATION OF LAUNDRY ROOM 720

UPLOAD THE FOLLOWING IF AVAILABLE 722

-TOP VIEW LAYOUT DRAWINGS

-PHOTOGRAPHS OF EACH ROOM

-EXTERIOR PHOTOGRAPHS OF DWELLING

-PHOTOGRAPHS OF LARGE METAL OBJECTS

FIG. 7

METHOD AND SYSTEM FOR SELECTING THE LOCATION FOR AN ACCESS POINT IN A DWELLING

TECHNICAL FIELD

The present disclosure is directed to selecting a location in a dwelling for placing an access point and, more particularly, to an app installed on the smart device that will assist in recommending a preferred location based on simulations and history data stored in database.

BACKGROUND

Many individual dwellings, such as a home or an apartment have a local router installed therein to provide Wi-Fi capability for people in the dwelling. The particular location of the router and, if one is needed, a mesh booster, can have a significant impact on the quality of the Wi-Fi connection to various smart devices throughout the dwelling. Although new Wi-Fi infrastructures provide a higher rate of the communication for more communication devices (e.g., smart devices connected to a router in a house for an internet access over a Wi-Fi protocol), the coverage area from the access point, such as a router, varies based on the surrounding physical environment and the location of the router. The higher frequency Wi-Fi signals might have a lower distance for the coverage range and are more susceptible to interference from physical objects compared with the lower frequency technologies. Due to increasing attenuations from the obstacles in the communication area (e.g., metal cabinets, ovens, walls of the rooms in a house), the range might become less. While measurements can be taken at the time the network is set up and take into account the then current physical objects in the Wi-Fi environment, this might require particular equipment and can be time consuming.

BRIEF SUMMARY

The inventors have realized that the selection of a location for placement of a Wi-Fi access point can be recommended by application stored on a client device, such as a smart phone. Using data about a dwelling in which the access point will be placed, the application can provide a preferred location to achieve high throughput of the Wi-Fi signal within that dwelling. In their studies, the inventors have realized that the throughput can be affected by configuration of the dwelling, including the number of walls, number of rooms in the dwelling, local structures in the rooms, such as a stove, microwave, washing machine, local obstacles between the AP and the client device, the AP and the mesh node and/or the mesh node and the client. All of these can be known in advance, collected from the user or simulated for a selected dwelling, then stored in a dwelling data base. When the user inputs the address of the dwelling, the preferred location for the AP can be provided based on this stored data.

The location in the dwelling in which the AP is placed, along with a mesh node, if present, has a significant impact on the Wi-Fi performance in the various locations in the dwelling. According to one embodiment, a method is provided for selecting the preferred location for the placing of an AP within a dwelling. An apparatus for carrying out the method is a client device, such as a smart phone on which an application stored and run.

According to one embodiment, an apparatus of determining a preferred location for a Wi-Fi access point in a dwelling is provided. This apparatus includes a memory having stored therein dwelling data that includes a layout for a plurality of dwellings and expected Wi-Fi propagation data for each respective dwelling stored in the database. A user inputs data to client device regarding the location of a selected dwelling. A computer processor in the client device receives the input data regarding the selected dwelling and performs the steps of: comparing the input data with the stored dwelling data; outputting results of a comparison of the input data and the stored dwelling data for viewing by a user; and outputting a recommended Wi-Fi access point setup location in response to the user requesting a recommendation. In one embodiment, the stored dwelling data includes a physical address of each of the plurality of respective dwellings. In another embodiment, the step of outputting results of the comparison of the input data and the stored dwelling data for viewing by a user includes outputting a layout map of the actual dwelling at the input location. The stored dwelling data can include simulations of a plurality of potential layouts of dwellings, the actual known layout of dwellings based on previously collected data or data of similar dwellings and expected similar layouts. The stored dwelling data can include simulations of a structures outside of the dwelling.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present disclosure, reference will be made to the following Detailed Description, which is to be read in association with the accompanying drawings.

FIG. 6 is a sample embodiment of a first menu of a graphic user interface on a local smart device.

FIG. 7 is a sample embodiment of a second menu of a graphic user interface on a local smart device.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to various communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a." "an." and "the" include singular and plural references.

Figure 1:
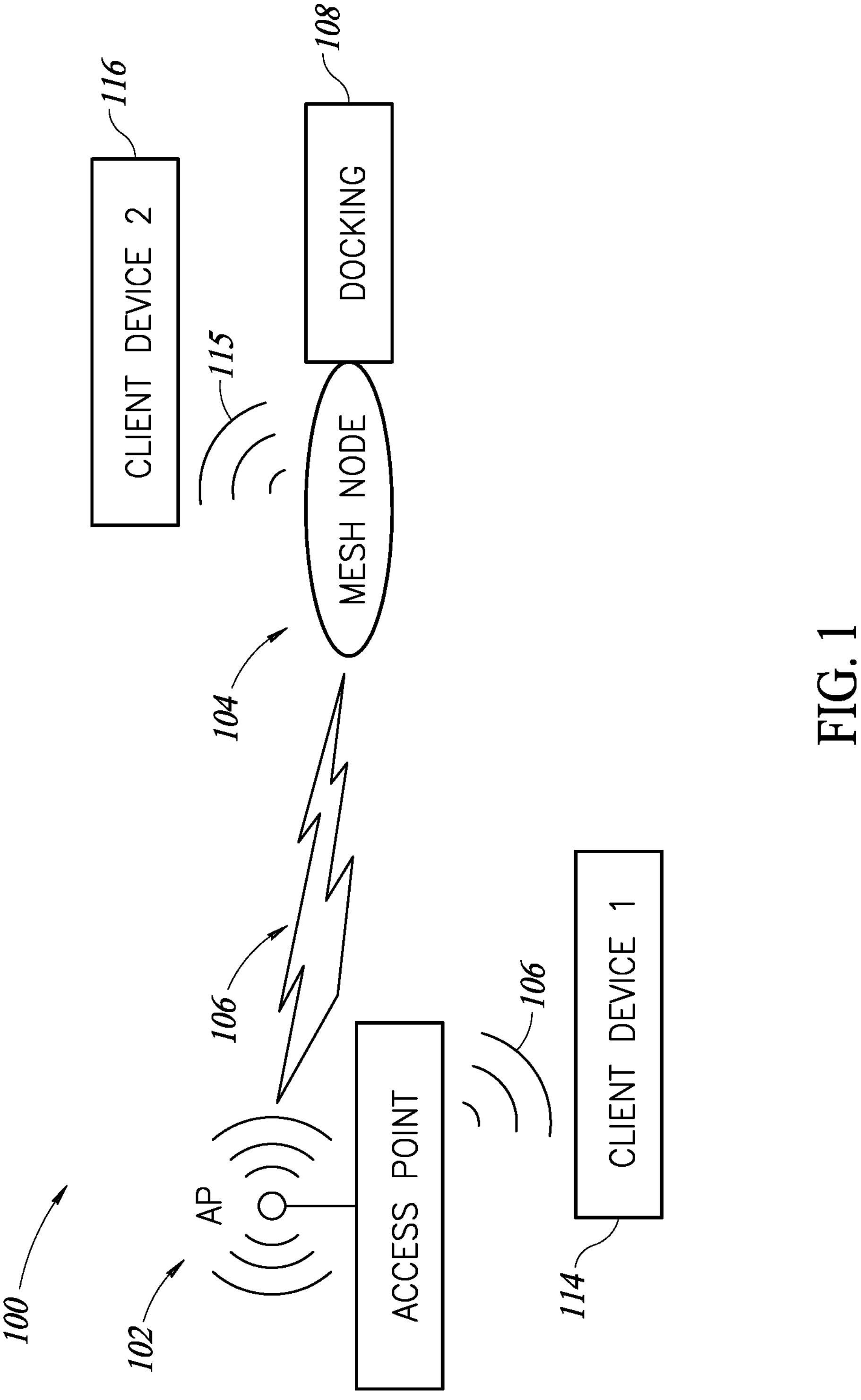
FIG. 1 is a block diagram illustrating a system for providing Wi-Fi connection throughput between an access point and client devices in accordance with embodiments described herein.

FIG. 1 is a block diagram illustrating a system 100 for providing a Wi-Fi connection throughput between an access point (AP) 102 and client devices 114, 116. The AP 102 communicates directly with nearby client devices 114. For client devices spaced farther from the access point 102, a mesh node 104 can be provided. The mesh node 104 operates as an intermediate node to provide the Wi-Fi signal between the AP 102 and the client device 116. The mesh node can receive a medium- or low-power and low-bandwidth Wi-Fi signal from the mesh node 104 and then rebroadcast it with boosted power and increased bandwidth. The mesh node 104 can be in a fixed location and connected to the appropriate power supply, or alternatively, it can be a portable mesh node 104 that can be moved to different locations and plugged into a docking station, such as docking station 108. The docking station 108 is an optional circuit that can be provided if desired, but is not used in many embodiments. If needed, a plurality of docking stations 108 can be provided in different locations. The mesh node 104 can be moved to these different docking stations, and thus, be portable if desired. The number of docking stations depends on the number of locations that need an enhancement of the Wi-Fi connection throughput.

The mesh node 104, whether stationary or portable, is coupled to the AP 102 by a Wi-Fi signal 106, and outputs the signal from it as a boosted Wi-Fi signal 106. To any client device 116 in the dwelling 400 it appears to be the access point AP and it can therefore be considered part of or an extension of the AP 102 and reference to the AP 102 includes all mesh devices that are coupled to it. The mesh node 104 is capable of coupling to each of the plurality of docking stations, docking station 108 being one example, and receiving electrical power from a power source of the respective docking station.

In this embodiment of system 100, a first client device 114 is positioned in a location that has a Wi-Fi connection throughput greater than a threshold. The first client device 114 is a stationary client device that is directly connected to the AP 102 to communicate over the Wi-Fi protocol. The second client device 116 is a mobile client device positioned in a location where the Wi-Fi connection throughput is less than the threshold. In this condition, the second client device 116 may lose an internet connection from time to time to the Wi-Fi provided by the AP 102 since it is mobile and might move to various rooms in the dwelling 400. The mesh node 104 is close enough to the location of the second client device 116 to output and provide a Wi-Fi connection for the second client device 116 of sufficient strength that it has a throughput to a value greater than the threshold. Accordingly, the second client device 116 can establish an internet connection with the Wi-Fi connection throughput greater than the threshold through the mesh node 104.

The client device might be present in different locations in a specific area (e.g., a house, a warehouse, or university campuses). For example, different cell phone users might be in three or four different rooms of a house. The AP and mesh node 104 will experience different Wi-Fi propagation based on their locations in the home and objects between them.

The system 100 provides an Internet access for a plurality of client devices in an area without a need to utilize multiple mesh nodes. In this embodiment, the mesh node 104 enhances the Wi-Fi connection throughput only in a location that one or more client devices exist. In various embodiments, the number of the client devices may be more than the two devices that are described in FIG. 1. For example, a plurality of client devices may be positioned in different locations in the area of the system 100. In this condition, a user may experience different throughput depending on their location, the mesh node 104 location, and the AP 102 location. The position of the mesh node 104 may be dynamically changed by the user. In addition, the location of objects around the network might change from time to time.

In various embodiments of the present disclosure, the AP 102 may be configured to connect to a router (e.g., via a wired/wireless network), as a standalone device, be the router itself or be an integral component of the router. A client device such as the client devices 114, 116 may be implemented by any physical wireless network-compatible device including software implementing a virtual network device, or the like. A client device or network device may include one or more mobile devices and/or one or more stationary devices. Examples of a mobile client device a smartphone, e.g., a feature phone or a computer driven communication device, a tablet, a laptop, a smartwatch, or any form of these device types, among others.

Examples of the wireless network signal 106 described herein may include a Wireless Local Area Network (WLAN), or a personal area network (PAN) such as a wireless PAN (WPAN), a Bluetooth network, or a nonlocal network (such as a Metropolitan Area Network (MAN), a Wide Area Network (WAN), or a Global Area Network (GAN)). The wireless network may include or be formed from a cellular radio network (e.g., an IEEE 802.11), a Bluetooth network, or another mobile radio network.

Short Range radio communication technologies may include Bluetooth, WLAN (e.g., according to any IEEE 802.11 standard), and other similar radio communication technologies. Cellular Wide Area radio communication technologies may include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax) (e.g., according to an IEEE 802.16 radio communication standard, e.g., WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

Figures 2, 3:
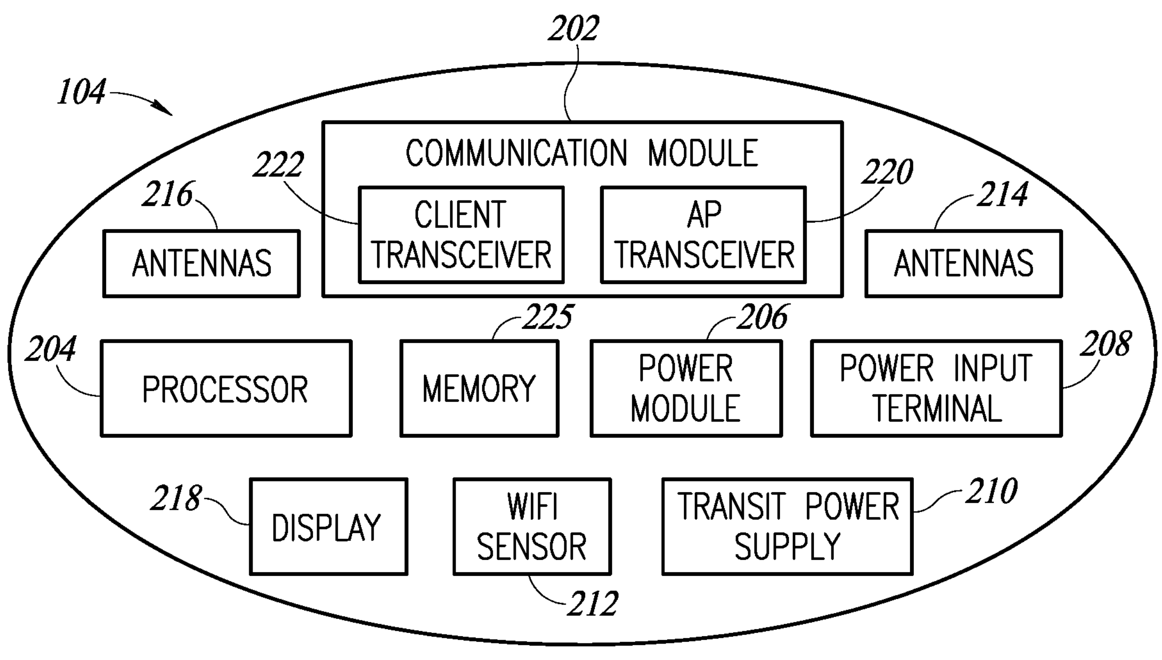
FIG. 2 is a block diagram illustrating internal components inside an optional mesh node in accordance with embodiments described herein.
FIG. 3 is a block diagram illustrating an optional docking station in accordance with embodiments described herein.

FIG. 2 is a block diagram illustrating potential internal components inside the optional mesh node 104 described in FIG. 1. The mesh node 104, if provided, may include a communication module 202, a processor 204, a power module 206, a power input terminal 208, a power supply 210, a sensor 212, a first set of antennas 214, a second set of antennas 216, a memory 225, and a display 218. The communication module 202 includes an AP transceiver 220 and a client transceiver 222. In various embodiments, internal components of the mesh node 104 may include some, more, or less components than the depicted block diagrams in FIG. 2.

The communication module 202 communicates by the AP 102 of FIG. 1 through the AP transceiver 220 and the first set of antennas 214. The communication module 202 communicates by the client device 116 of FIG. 1 through the client transceiver 222 and the second set of antennas 216. In various embodiments, a plurality of client devices is distributed in a location around the docking station 108. The communication module 202 may include an internal amplifier to amplify the received signals from each of the client device 116 and the AP 102 to be transmitted to each other. Hence, the client device 116 is able to achieve an internet access by the Wi-Fi connection throughput to the AP 102 greater than the threshold, even when it is positioned in a location that is not in the coverage of the AP 102.

The power module 206 may include voltage regulators, converters, inverters, and any other components that are needed to transfer the received electrical power from the power input terminal 208. An optional transit power supply 210 can be provided, but is not required. The power module 206 supplies the received power into the other components such as the communication module 202, the processor 204, and the sensor 212. The power module 206 may include different converter and regulation circuits coupled to each of the power input terminal 208 and the transit power supply 210. In this condition, the power received from the power input terminal 208 is greater than the power received from the transit power supply 210, and consequently different regulation and converter circuits are coupled to the power input terminal 208 rather than the regulation and converter circuits being coupled to the transit power supply 210.

The power input terminal 208 includes a power socket to be coupled to an external power source such as the docking stations 108. In various embodiments, the power socket may be compatible with any plug types (e.g., Type-C, Type-B, Type-F, and Type-A). The power socket may also include USB port and other type of ports to be coupled to the external power source. In addition, the power input terminal 208 may include a wireless power transfer (WPT) module to wirelessly receive electrical energy from a wireless power transmitter of the docking station.

The transit power supply 210 may include a supercapacitor. The supercapacitor may have a capacity to provide the sufficient electrical energy for the components of the mesh node 104 for a selected period of time. In some examples, the period of time may be a few minutes (e.g., 10 min). This period of time provides the opportunity to move the mesh node 104 from a docking station to another docking station without interruptions in the Wi-Fi connection throughput. In addition, or in place of a supercapacitor, a battery, whether standard or rechargeable battery may be used to increase the period of time that the mesh node operates without the need to be coupled to an external energy source. Alternatively, an external rechargeable battery can be coupled to the power module 206 when a user needs the mesh node 104 to operate for a longer period of time without coupling to the docking stations 108.

In some embodiments, the power module 206 may include a battery management system (BMS) to detect the type of battery that is coupled to the transit power supply 210 and read the state of charge (SoC) of the coupled battery. In this condition, the BMS sends the SoC to the processor 204 to determine an operation mode of the mesh node 104 based on the SoC of the battery. The processor 204 may send the SoC to the display 218 to inform the user about the remaining time of operation without connection to the docking station. In same conditions, the power module 206 may send an indicative signal to the processor 204 for indicating if the mesh node 104 is coupled to a docking station or is using electrical energy of the transit power supply 210. In response, the processor 204 may change the operation mode of the mesh node 104 to a low-power mode. In addition, the BMS may transfer a portion of power from the power input terminal 208 into the transit power supply 210 to charge the supercapacitor or the rechargeable battery when the mesh node 104 is coupled to the docking station.

The processor 204 determines if the mesh node 104 is coupled to a docking station (e.g., 108) or operates with the power of the transit power supply 210. If the processor 204 determines that the mesh node 104 is coupled to a docking station, then it may send a command to the communication module 202 to operate in a normal mode. During the normal mode operation, the communication module 202 utilizes all the antennas (e.g., 214 and 216) and operates in the highest transmission and receiving data rate over a Wi-Fi protocol. For instance, in the normal mode the communication module 202 may operate in Wi-Fi 7 protocol with a rate of about 40 Gbps. In this example, the communication module 202 may also operate in Multi-Link Operation (MLO) mode which increases Wi-Fi connection throughput. If the processor 204 determines that the mesh node 104 is not coupled to the docking station, then it may send a command to the communication module 202 to operate in a low-power mode. During the normal mode, it will charge the supercapacitor and/or rechargeable battery, if either is present, and maintain them fully charged.

In some embodiments, the communication module 202 may limit the number of client devices coupled to the mesh node 104 when it is operating in the low-power mode. For example, a threshold of number of client devices that can be connected to the mesh node 104 may be stored in the processor 204. When the processor 204 sends the command of low-power operation to the communication module 202, it may determine the number of the client devices that are connected to the mesh node 104. In response, the processor 204 compares the number of the client devices with the threshold of number of client devices. If the number of the client devices coupled to the mesh node 104 exceeds the threshold, then the processor 204 may prioritize the client devices and disconnect the client devices with lower priority compared with the other client devices. The priority, for example, may be introduced based on the data rate that each client device is using or based on a time period of connection of each client device to the mesh node 104. By limiting the number of the client devices in the low-power mode operation, the mesh node 104 consumes less electrical energy compared with the normal mode operation.

In some embodiments, it is possible, but is fully optional, to also have a sensor 212 may include an MCS sensor and also a CSI sensor. Only a single block for sensor 212 is shown, but it is to be understood that this block is not needed in all applications, or, if present, can include multiple sensors, including amplitude sensors, phase information, and other types of sensors for creating an MCS index and also collecting all the data associated with the CSI signal. In addition, it includes a sensor for determining the Wi-Fi connection throughput. It can measure the Wi-Fi connection throughput between the AP 102 and the mesh node 104 and also between the mesh node in the client device. The sensor 212, if present, can send a throughput indicative signal to the processor 204 indicating the Wi-Fi connection throughput between the AP 102 and the mesh node 104. The processor 204 compares the throughput indicative signal with the throughput threshold. If the throughput indicative signal is less than the throughput threshold, then the processor 204 displays an alert message in the display 218.

The throughput is a measure of the amount of information, namely data, which is passed between the two devices within a given amount of time. In a data transmission, network throughput is the amount of data that is successfully moved from one place to another within a selected time period. It can be measured in megabytes per second (Mbps) or in gigabytes per second (Gbps).

In some embodiments, the sensor 212 may include a short-range communication measurement system to detect a docking station in proximity to the mesh node 104. In this condition, the short-range communication measurement system sends a short-range signal (e.g., over Bluetooth or near-field communication (NFC) link) to the docking stations in a location (e.g., 108). If the sensor 212 receives an acknowledgement signal from a docking station, then it sends an indicative signal to the processor 204 to display that a docking station is available in proximity of the location of the mesh node 104. In some examples, the acknowledgement signal may include indicative data about the docking station, such as an identification number of the docking station. The processor 204 may send the identification number of the docking station to the display 218 to notify the user about the presence of the docking station in proximity of the mesh node 104. In various embodiments, the display 218 may include some features such as an alarm LED and a loud speaker that notify the user about exiting the coverage range of the AP 102 and a low-level of the electrical charge of the power supply 210.

The memory 225 stores information that is obtained by the sensor and also the analysis and performance of the system as executed by the processor 204, more details of which are described elsewhere herein.

Even though FIG. 2 has been shown and described as the details for the mesh node 104, the same circuits and functions are also performed by the access point 102 or the client device 116 and a mesh node is not needed. Accordingly, FIG. 2 should be understood as showing optional structure and operation of the access point 102, and the explanation is not repeated herein with respect to the access point 102 since it would be duplicative.

FIG. 3 is a block diagram illustrating internal components inside the stationary client device 114 or the mobile client device 116. Since the client devices 114 and 116 are the same, the description applies to both of them. In a preferred embodiment, the client device is a smart computing device, such as a smartphone, smartwatch, a notepad computer, notebook computer, a wirelessly connected desktop computer, or the like. The client device 116 includes all of the circuits, function and components normally present in such a smart computing device, but only a few such circuits are shown based on their relevance to the present disclosure and it is to be understood that many other circuits and functions will be present in client device 116.

The client device includes a network interface 302, a processor 304, a power supply 306, a display 310, a memory 312 and an image sensor 314. In various embodiments, the network interface 302 may wirelessly communicate with the mesh node 104 or the AP 102. The network interface 302 may exchange data with the mesh node 104 about the electrical charge level of the transit power supply 210, the coverage area of the AP 102, and the number of clients present in the location of the docking station 108 to be coupled to the mesh node 104.

The processor 304 reads the data received from the mesh node 104 or the AP 102, depending on which it is communicating with and represents on the display 310 to notify the user of the Wi-Fi throughput in the communication. In some examples, the display 310 may include some features such as an alarm, whether visual or by audio speaker, that notify the user that the throughput is below a threshold level.

Specifically, the user client device 116 can send the signal to the Wi-Fi source, whether AP 102 or mesh node 104 and ask to receive information regarding its throughput measurements. The client device 116 therefore has available to it its locally measured throughput measurements as well as the data collected by the source of the Wi-Fi signal.

One example of for the image sensor 314 in the client device 116 is a standard camera of the type present on all smartphones. A camera on notepad computer processer, a smartwatch or client device can also be used. The client device 116 can therefore be a computer notepad, a notebook or other computing device with a processor and a camera. It is beneficial to use a camera in the client device 116 in order to obtain the images of the various rooms in the dwelling, as described in more detail elsewhere herein. The executable program described herein can be an application on the client device 116, such as an app on a smartphone.

The memory 312 of the client device 116 includes a database having dwelling data stored therein. The dwelling data includes a large amount of characteristics about a plurality of actual dwellings as well as simulated dwellings. In addition, for each sample dwelling, the expected Wi-Fi propagation characteristics are stored for that particular dwelling.

There are a number of techniques to create and build a database having dwelling data stored therein. Examples of a number of these will now be described, and those of skill in the art will be able to create a dwelling database using these features, as well as other features available in the art. A first source for dwelling information is the actual reports of dwellings that have used the same application. In particular, when the application is uploaded to a client device 116 and used in a particular dwelling, the address of that dwelling is stored in the database. The various characteristics of that dwelling, for example the number of rooms, the location of the walls, the location of any appliances in the various rooms, etc., will be stored in the database associated with that particular dwelling and address. At a future time, if another party wishes to install an access point at that same address, when the initial address is input, the database will recognize that it has actual data for that particular address and will therefore provide an output with an indication of the recommended access point 102. It may optionally also output an indication that the recommendation is based on the address of that specific dwelling already in the database and that the recommendation is based on known good data for the preferred location of the access point at that particular address. As the present application gains wider usage, the number of addresses stored in the database that are based on actual data of a known preferred location for the access point will continue to grow.

Another source of dwelling data is information about adjacent dwellings that may be similar in many respects. The dwelling of interest may be in an apartment complex which may have dozens or in some instances hundreds of apartments with exactly the same configuration, namely the same number of walls, rooms in the same location, and a similar or identical layout of the main appliances and location of an office workspace. If the address of a similar apartment in the same apartment complex is already in the system, then the system will recognize that the address being queried is in the same apartment complex and will also recognize whether the layout is the same for an apartment that has been previously analyzed. It will therefore use the dwelling data from the similar apartment in the same apartment complex in providing a recommendation for preferred location of the access point 102. Dwellings may also have similar layouts which are in residential neighborhoods, even if they are not in the same duplex, apartment complex or facility. For example, there are many housing subdivisions in which there might be four different styles of homes of the system 100 homes in the housing subdivision. Each style of home will have the same layout, with the kitchen, laundry room, office working space and other main rooms in the same location with the same number of walls. The database will have stored therein the address of any other dwelling that is in the same housing complex and also an indication of the style of that home. When the user inputs the address of the dwelling into the application, a search can determine whether or not that exact style of home in the same or similar housing development has already been analyzed and a preferred location for the access point 102 been located. This data can then be used to recommend the preferred access point location in that dwelling.

Yet another source of dwelling data is home layout simulations generated by the creators of the database. The programmers can store in the computer various home layout simulations. For example, they can create a simulated home having two bedrooms, one bathroom, and one kitchen. They can also create a simulated layout of the dwelling having one bedroom and one kitchen or a dwelling having three bedrooms, a living room, an office, a laundry room, a study, and a kitchen, each in a particular location. Several hundred, or several thousand simulations can be created that would be a near match for existing dwellings in which an access point is likely to be installed.

Another source for dwelling data is the input of actual dwelling data from numerous locations across the geographic area. A programmer of the system can enter into an apartment complex and create a layout map of the exact apartment for that complex. This can be stored as unknown correct layout that matches a particular apartment complex even though it has not yet been used by a prior customer to place an access point. In a similar fashion, the blueprints of homes in a housing development can be uploaded into the database. When new apartment complexes, housing developments, and other dwellings are built, the maps of such new structures are often uploaded electronically in the various counties and states in which the buildings are being constructed. This will be done to comply with housing codes and such uploads will frequently include the layout of each apartment within that particular complex or each home within the housing development. These layouts are often in electronic form that is easily uploaded to a database. This information can be obtained from the various city, county, and local governments, whether from a zoning map, water district, building inspection department, or other source in which the local government stores such data. The layout of such homes will contain within it the address of the home and provide within the layout in the design drawings the number of rooms, the number of walls, the total area, the number of floors, and often a complete map of where measurement utilities will be placed including refrigerators, washing machines, and other large metal objects that would affect the propagation of a Wi-Fi signal. Thus, building planning records currently on file in many government offices that provide building permits may currently have, and will have in the future, the actual layout of large numbers of dwellings within a certain geographic area. These can be uploaded electronically into the database and stored together with the address, together with an indication of other dwellings having a similar layout.

A number of techniques for generating a useful dwelling database have been described, and one or more of these techniques can be used to create a dwelling database.

The dwelling database will frequently include the number of rooms in the dwelling, the number of walls, the location of the walls, the total area, and the layout map of the dwelling. It may also include an indication of structures adjacent to the dwelling, for example large air-conditioners along the outer walls, radio towers or other structures that are close by which may in fact affect the Wi-Fi propagation within the dwelling.

Figure 6:
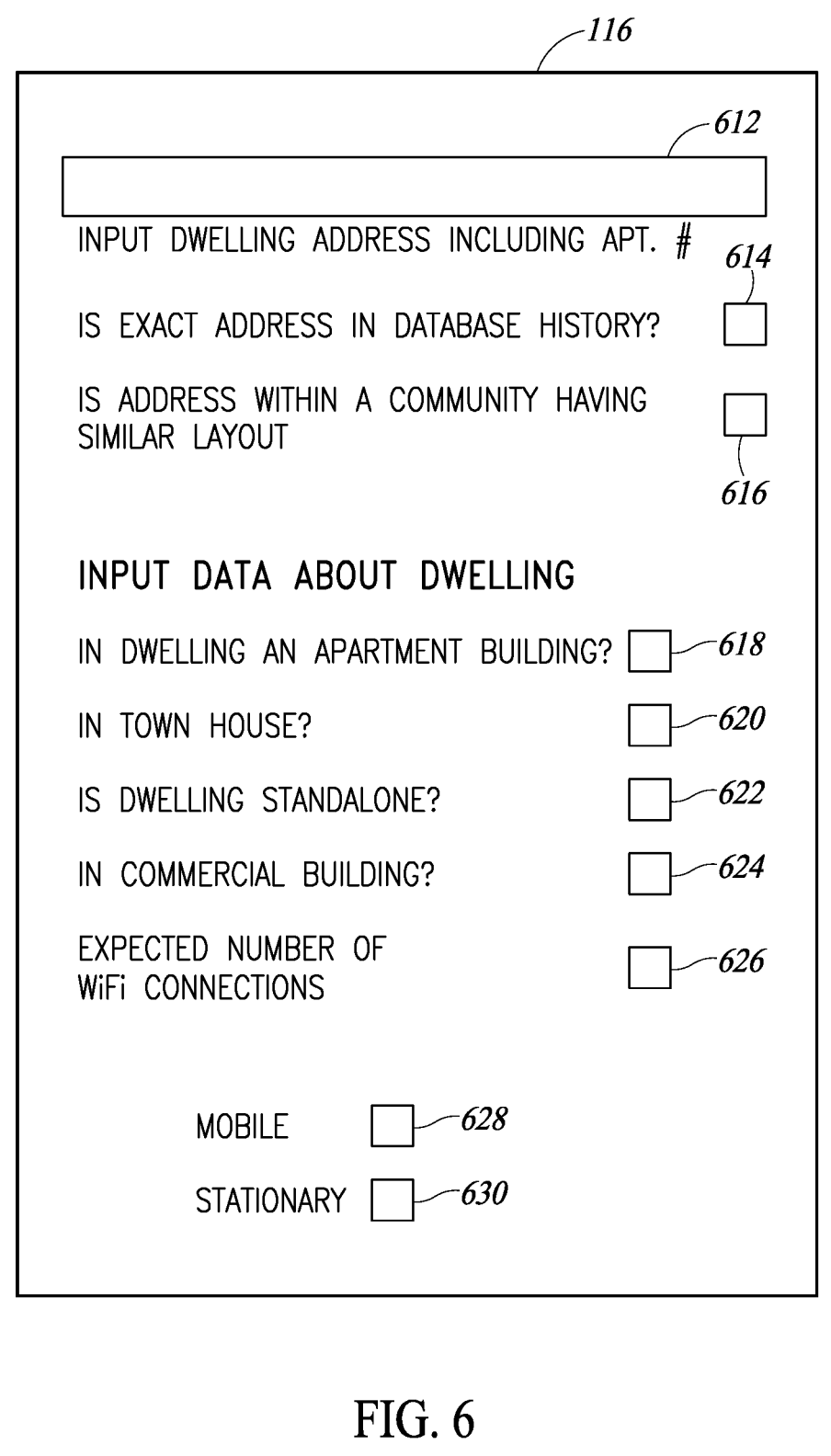

According to one embodiment, the client device has an input screen as shown in FIG. 6. The input screen has a box 612 into which the address of the dwelling can be input. The dwelling database is then checked to determine whether or not the address of that selected dwelling which has been input is previously stored in the database with all of the information related to the layout and other details of the dwelling. If the answer is yes, an indication can be provided in box 614 that the address input matches the address of the dwelling already stored in the database. As previously mentioned, the layout information can be obtained from numerous sources, including a previous resident of the same dwelling, an identical layout of an apartment complex in the same apartment complex, an identical layout of another home in the same planned community, an upload from a local government building code database, or other source. If the exact address is in the database as indicated by box 614, then this indication is provided to the user and in a subsequent presentation on the screen, the user can verify that the layout corresponds to the layout of their current dwelling. Once this is confirmed, then the preferred location of the access point can be provided to the user based on data which is stored linked to that particular address in the database.

The system can also provide an indication whether or not there are addresses within the community having a similar layout in box 616. For example this may be in a planned community, one apartment of a large apartment complex in which another apartment has the exact address input from an historical data, or other source.

If the exact layout of the dwelling is not available already in the database, then a number of questions can be answered in order to receive data so that a recommendation for the location of the access point AP 102 can be provided. FIG. 6 shows one example of the types of questions that may be asked for which the user will provide input. For example, whether or not it is an apartment in an apartment complex in box 618, whether it is townhouse attached to other townhouses for input box 620, whether it is a standalone dwelling at input box 622, and whether it is part of a commercial building, for the example the upstairs of a restaurant in box 624. The user may also indicate the exact number of Wi-Fi connections to be expected in box 626, which of those are expected be mobile in box 628 and which are expected to be stationary in box 630.

On another screen, the user may input additional details about the dwelling, for example, the number of rooms in the dwelling in box 702; the number of floors, whether one to three or more floors in box 704; the total square footage in box 706 for which the access point is expected to reach; and the indoor square footage in box 708, as well as an indication of the outdoor square footage in box 710. In addition, a number of questions can be asked of the user, for example, providing the number of internal walls in box 712, the number of external walls in box 714, a location of a kitchen in box 616, a location of an entertainment center or office in which high Wi-Fi uses are expected in box 718, and a location of a laundry room in box 720. The locations of these various rooms provides important indications as to the expectation of how a Wi-Fi signal will propagate through the dwelling. As discussed elsewhere herein, large metal objects, such as washing machines and refrigerators, have a significant impact on the propagation of the Wi-Fi signal, particularly if the large metal object has an induction motor or itself outputs various Wi-Fi signals.

The system also can provide for the upload of information about the dwelling in box 722. For example, the user may have available a layout drawing of their dwelling which can be uploaded. In addition, the user can walk through the home and take photographs of each room. The photographs will show the total of number of rooms in the dwelling, the general location of the walls, the number of walls, and many other factors about the dwelling. All of these photographs can be uploaded into the database. The database can then use machine learning and object identification using well-known photographic recognition tools to determine the layout of each room, the main objects in each room, and other information. In addition, the user can upload exterior photographs of the home which would show objects adjacent to a particular wall, whether a larger air conditioning unit, a neighbor's large metal garage shed, or other objects outside the dwelling that may have a significant impact on the propagation of a Wi-Fi signal within that dwelling. Further, the user can upload photographs of large metal objects in the dwelling, for example of a refrigerator, an oven, a washer and a dryer, a chest freezer, and even smaller metal objects, such as a toaster, microwave oven, or other objects which may impact the propagation of Wi-Fi signal. The photographs of such metal objects will indicate the room of the dwelling in which they are placed and such data will be stored in the system for use in analyzing the preferred location for an access point 102 within the home.

After the user has provided input regarding the selected dwelling, then the application can provide to the client device 116 a layout image of the dwelling for confirmation by the user. This image can be shown as a top side plan view of each individual floor, alternatively it can be a 3D image of the dwelling. The layout will be provided to show to the user the believed layout of the dwelling for the user to confirm that it is correct. With the layout present and being shown to the user, the user can then indicate on the client device the location of particular objects. For example the user can mark a particular room as being a working office in which high Wi-Fi capability is required. They can also mark, if not marked already, the location of a kitchen, a laundry room, a garage, or other particular objects. Each room can be labeled and further input can be provided by the user. In addition, the user can indicate any stationary client devices 114 which are expected to be in the home. The location of these stationary client devices which are required to have strong Wi-Fi throughput can, thus, be indicated and labeled on the sample layout that is provided to the user.

With the layout present on the client device being viewed by the user, the user can also indicate a particular room in the layout, go into that room and take a photograph of that room and upload that photograph as representative of that room. This will provide additional data to the application about that particular room that can be stored in the database for that selected dwelling.

After the user has viewed the layout provided on the client device, and confirm that it is accurate and that the desired data has been input, they can then request the application to output the preferred location for the access point 102 to have the optimum Wi-Fi throughput for that particular dwelling. This will be based on a number of factors, including the number and location of client devices, the location of a working office in that particular dwelling, the number of rooms, the number of floors, the number of walls, and many other factors. The brand and model of AP 102 will have a different strength, throughput and connection ability. As can be appreciated, there are numerous databases available today which indicate the strength of the Wi-Fi signal output by a particular access point and any directional strength it may have, as well as its ability propagate through walls and adjacent to large metal objects. Accordingly, a database having details of the access point 102 being used by the user can be queried to determine the operation of that particular access point and its ability to provide a Wi-Fi signal throughout a dwelling. This can be include and taken into account when recommending a location of the AP 102 in the steps shown in FIG. 8.

The user may also be asked to input the exact access point 102 to be used. For example what is the model and brand of the router, what frequency of the router is capable of using, the GPP mode being used, whether 3G, 4G, 5G, 5G, etc. whether or not a mesh node will be present, and other information available from the manufacturer of that particular access point regarding its characteristics and properties. This information about a particular brand and model of an access point is generally available from the manufacturer of the access point and can be obtained on the client device by downloading the information from the Internet, via the cloud, or some other source. When all this information is input to the database, the analysis can then be performed to recommend a preferred location for the access point in order to ensure that client devices within that particular dwelling have optimum Wi-Fi coverage.

Figure 4A:
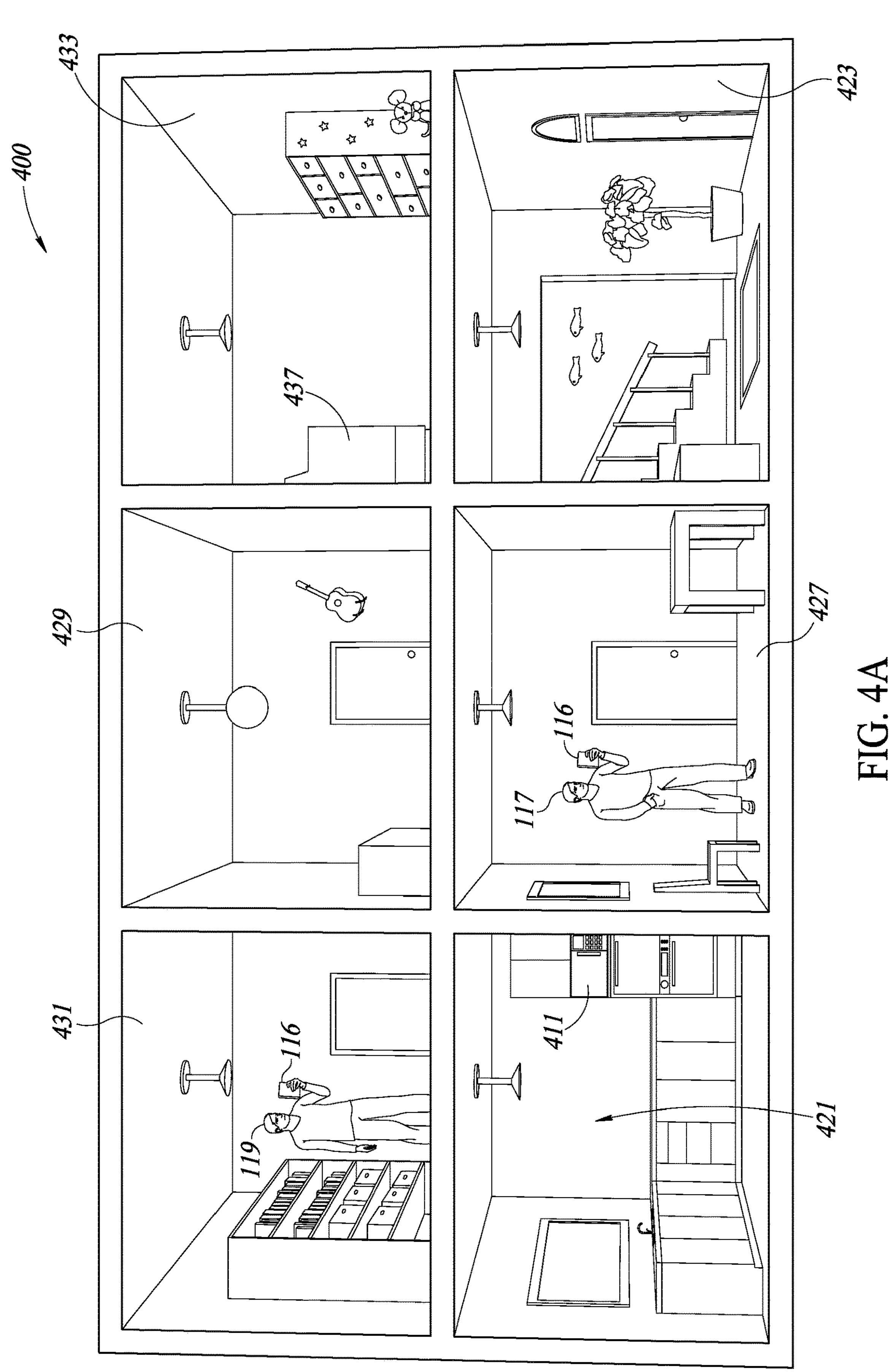
FIG. 4A is a 3D view of an example of a multi-floor dwelling in which a user is setting up the access point according to the present disclosure.

Particular examples for use of the present application will now be provided with respect to FIGS. 4A-4C and 5. FIG. 4A shows a dwelling 400 into which an AP is to be placed according to the network of the present disclosure, prior its placement. A user 117 stands in a first room 427 holding a client device 116. An application is loaded onto the client device to assist the user in determining where to place the access point to obtain a desired coverage. This particular dwelling 400 is a multistory dwelling with the ground floor in room 427. Room 423 is shown as a front room with an entryway and stairs going up to the second story, though of course the entrance can be in any desired configuration. As can be appreciated, the dwelling 400 merely shows examples of potential rooms that may be in a multistory dwelling and is not intended to be an actual representation of one particular dwelling. For example, the multistory dwelling 400 may include a kitchen 421, a home office (study/library, etc.) 431, a storage room 429, and a laundry room 433 having a washer and dryer 437, as well as other storage such as a chest of drawers for clothes.

Stored on the client device 116 is an application for providing a recommendation to the user 117 for the proper location of the AP 102, whether a mesh node 104 will be needed and, if so, where the mesh node 104 should be placed. The application stored on the client device has a memory, in addition to or as part of the memory 312 having the database, in which an executable program is stored for carrying out the process that is described herein, examples of which follow. Image data, whether video or still photograph, of each room can be collected by the user during the initial set-up and input as samples to the database for part of the analysis and comparison. The images of the respective rooms, such as rooms 427, 429 and 431, can therefore be analyzed during the first set-up process. Using computer vision, image databases accessible via the internet, AI, and/or machine learning, the particular large metal appliances or other objects in each room can be identified and taken into account in making the recommendation for the location of the AP.

The image taken by the camera can be analyzed using object recognition technology, many types of which are available in the art of image technology today. For example, the type of object can be sensed by the smart imaging technology to be a stove; a picture of a person; a table; a chair; an appliance, such as a microwave, refrigerator, coffee maker, etc.; a filing cabinet and whether the filing cabinet is metal or wood; a couch; or other types of objects. Advanced image analysis might be used to classify more details within the type of image, for example, the brand of coffee maker, microwave, stove, and even the model number of the appliance by performing an image search on global network, such as the Internet. If the brand and/or the model number is known, details about the appliance can then be learned to determine the amount of metal, if it contains large magnets, Wi-Fi wave reflective surfaces, Wi-Fi wave absorbing material, Wi-Fi input or output antennas, and other data that can provide an indication of how likely it is that this object will interfere with, alter, reflect, refract, absorb, or otherwise modify a Wi-Fi signal.

The presence of an appliance, particularly one that emits signals, such as a microwave oven, or has a large motor or a spinning drum, such as a clothes washer or clothes dryer, will cause a significant variation in the signal propagation from the access point 102. This variation can be a reflection, blocking, or refraction of the signal. Namely, the signal may reflect off of or be refracted by the microwave oven 411 which has been placed on the wall some distance from the access point 102. A large metal filing cabinet will also have a significant impact on the Wi-Fi signal characteristics. A normal user 117 may not recognize immediately that the signal propagation is drastically affected by having a microwave oven 411 in the room or placing the AP 102 or the mesh node 104 on top of a metal filing cabinet. The presently disclosed application will recognize the presence and the identity of such objects and recommend placement of the AP 102 in a location such that they will not interfere with the throughput of the Wi-Fi signal throughout the dwelling 400.

Another user 119 may go to a different room, such as the home office 431, (study/library, etc.), and use their own client device 116 to investigate the details of that particular room, including taking photographs and uploading them to the application dwelling database. Accordingly, data can be collected from a number of rooms in the dwelling in order to obtain the most information about the selected dwelling prior to the recommendation of an access point.

Figure 4B:
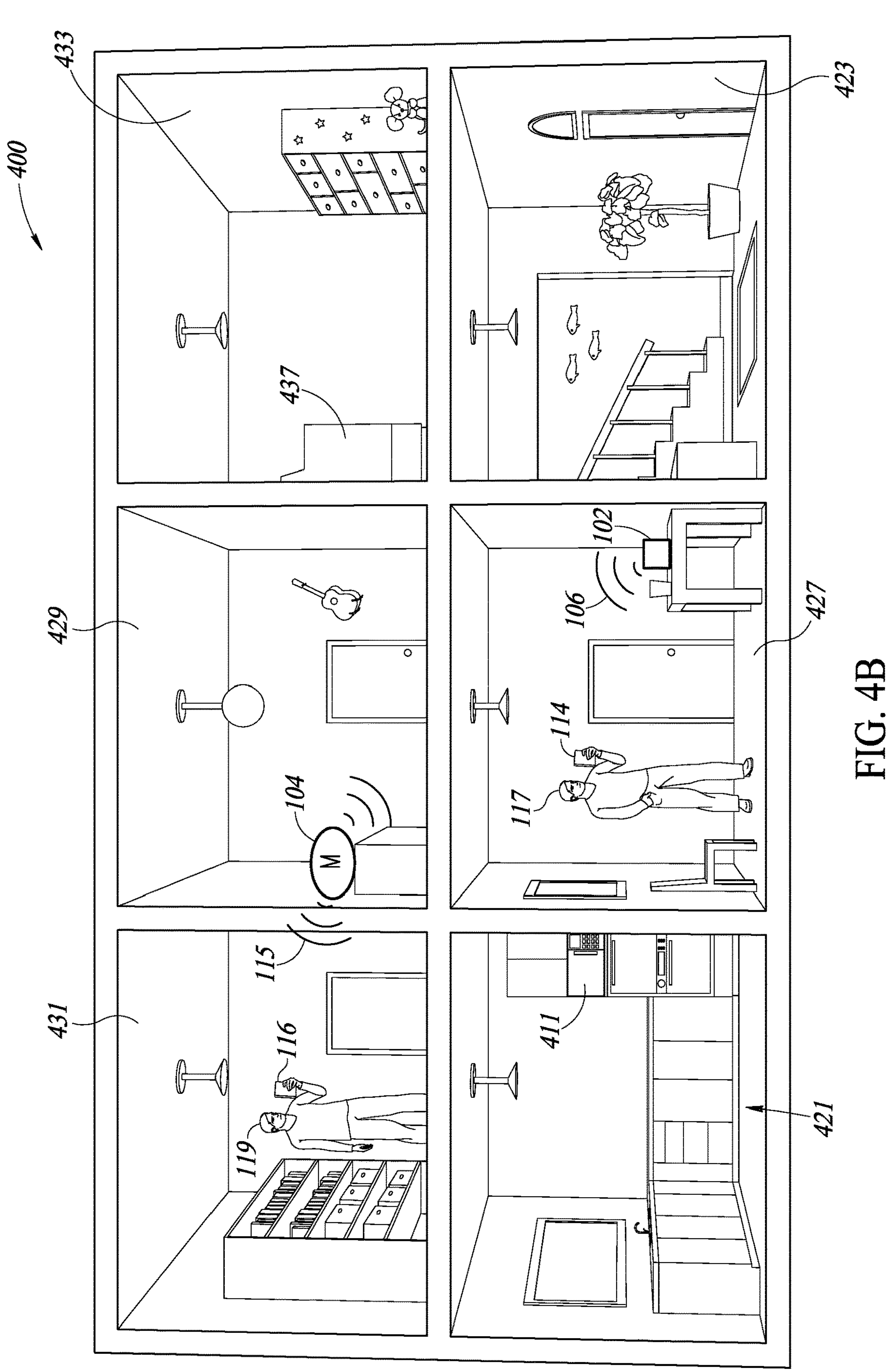
FIG. 4B is the image of FIG. 4A in which the access point has been placed according to the present disclosure.

FIG. 4B shows the results of the recommendation of the access point 102. In particular, after the layout is analyzed and it is appreciated that the dwelling 400 is a multistory dwelling a recommendation is made that the access point should be placed in room 427 and that it be placed adjacent to one of the walls. In addition, the system recognizes that based on the large number of rooms (in this instance six), the two stories, the need to have strong Wi-Fi throughput in the home working office (study/library, etc.) 431 and that a mesh node 104 is recommended. Accordingly, the recommendation of a mesh node 104 in a central location upstairs will be provided as an output by the system.

Figure 4C:
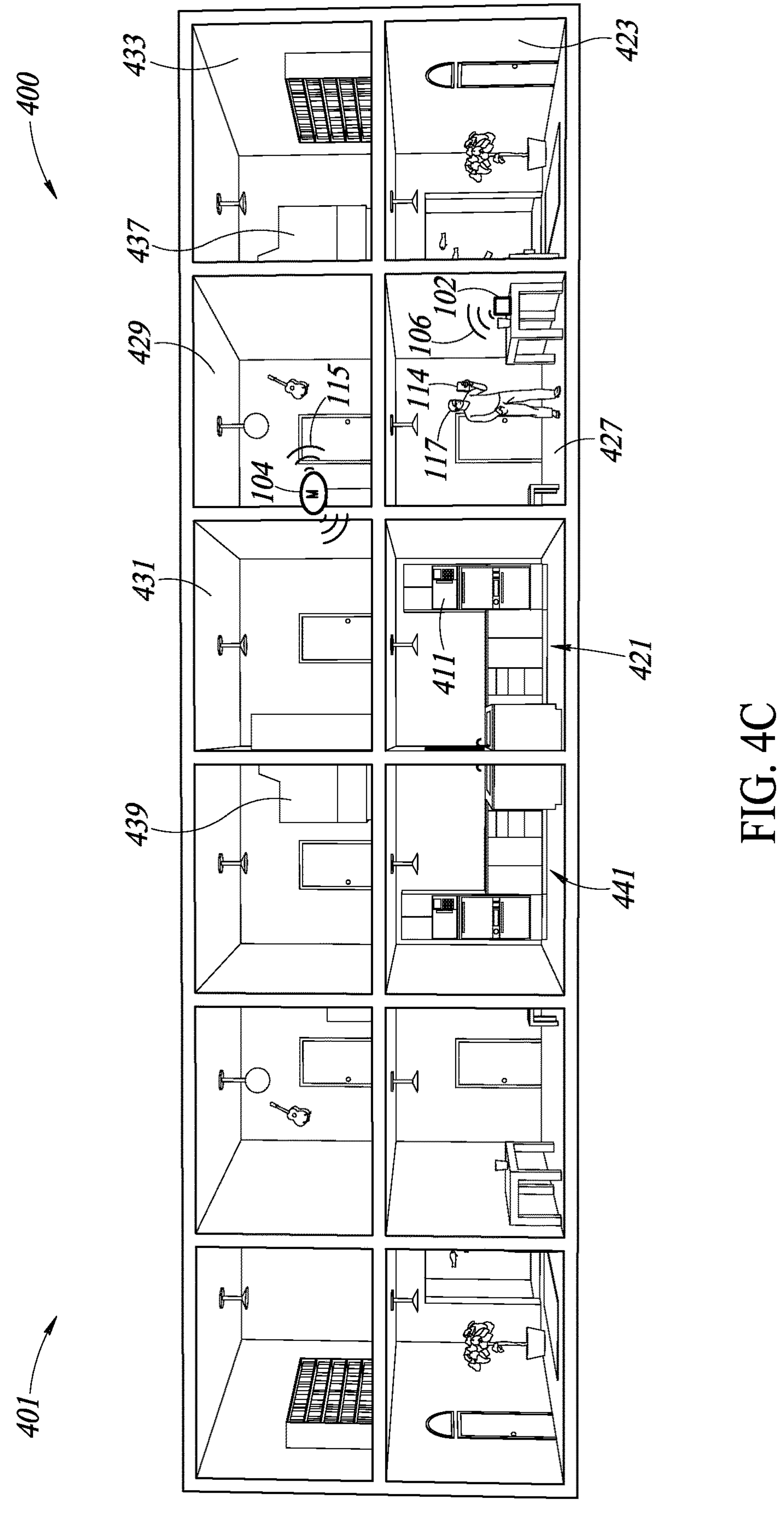
FIG. 4C is a 3D view showing external structures of FIG. 4A according to the present disclosure.

FIG. 4C is an image of the external surroundings of the dwelling 401 showing on the left-hand side an identical apartment which has its washroom and also its kitchen directly adjacent to rooms 431 and 421. The presence of a large metal structure, such as washer and dryer adjacent to room 431 will also be recognized in the simulation for a large apartment. Since the washer and dryer 439 in dwelling 401 are next to the study and/or office in the dwelling 400, it will interfere with the Wi-Fi and thus the mesh node 104 might need to be moved to be within the home based office 431. Similarly, having a kitchen 441 in the adjacent dwelling 401 right next to the kitchen 421 in the dwelling 400 might impact the propagation of the Wi-Fi signal. The database can include, whether from actual data of the entire apartment complex or simulated data the presence of such external objects to the dwelling 400 being reviewed. In situations where the dwelling is part of a commercial complex, for example an upper floor that is above a group of stores or restaurants, having large industrial equipment in the ground floor of the same building might have a significant impact on the propagation of the Wi-Fi signal and therefore a recommendation may be made to place the access point 102 near the ceiling of the dwelling rather than adjacent the floor of the dwelling. Accordingly, data regarding external devices can also be in the dwelling database, whether via actual input from the user, from other users, by simulation, etc. and used in the recommendation for the location of the access point.

Figure 5:
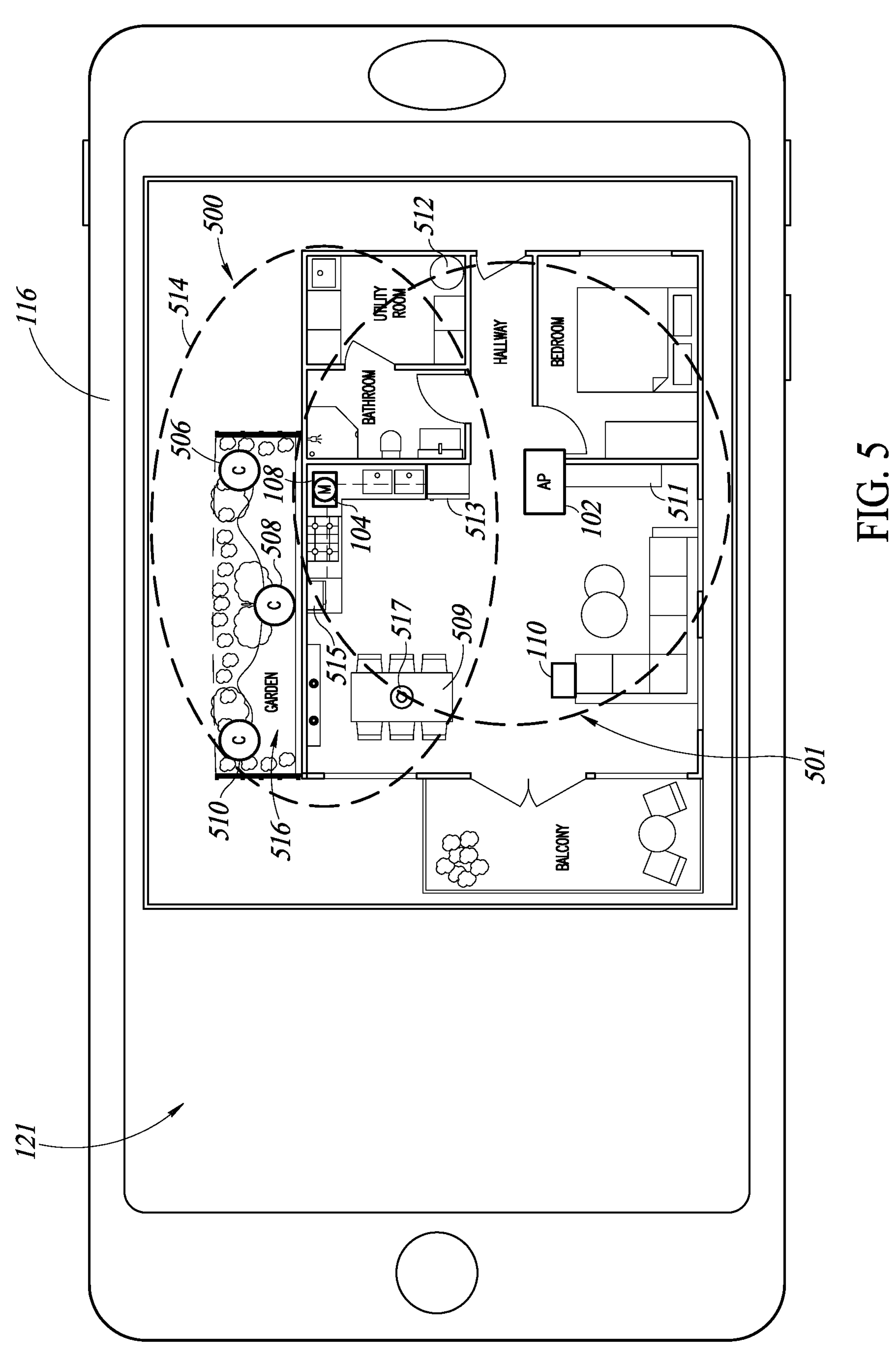
FIG. 5 provides an example of the diagram for Wi-Fi system of a single-floor dwelling shown on the display screen of a client device as displayed in accordance with embodiments described herein.

FIG. 5 provides a layout view on the screen 121 of the recommended location of an access point similar to what may be shown on the screen of a client device 116 after all the data is input and a recommendation is being provided on the display of the client device for placement of the AP 102, and, if needed a mesh node 104. Namely, after the data is been input as previously described, the client device 116 can provide an image to the user similar to that shown in FIG. 5 indicating the location of various bedrooms, a utility room 512 having the washing machines, a bathroom, a kitchen, a dining area, and a living room, as well as an outdoor garden 516 on one side and a balcony on the other side on the screen 121 of the client device 116. The user can also be provided an estimate of the coverage AP 102 by indicating dashed line 501. The user has the option to add additional data to the layout that is provided by the present application, namely an indication that refrigerator 513 is present in the kitchen, table 509 is present having a large metal object 517 thereon, such as statue or a vase, a large metal cabinet 110, a microwave 515 in the kitchen, and other devices. Similarly, the presence of various objects 506, 508 and 510 in the garden 516 that may correspond to metal objects, such as statue, a hot tub, a water fountain, or the like may also be present. These large metal objects, or electrically conductive objects in the example of a hot tub 510, or water fountain 508, adjacent to the house and in the garden 516 may restrict the coverage of the Wi-Fi signal from access point 102 as shown in the dashed lines, and after the user has indicated they are present, the system can update it recommendations and indicate that a mesh node 104 should be added together with a docking station 108 since there are some many objects that might interfere with signal from the AP 102. In addition, the presence of the utility room 512 having laundry machines and a sink may also interfere with the Wi-Fi signal and, therefore, additional coverage can be recommended in the form of adding the mesh node 104 and its placement can be directed to increase and improve the coverage in the utility room 512 and garden 516 that would otherwise block some signal from the access point 102 as shown by circle 514.

Thus, the system and method provide one embodiment in which the layout is shown to the user on their client device 116 and the user can modify the layout, such as by adding rooms, wall objects in rooms, including large metal objects, and then a recommendation is provided after approval of the user. In another embodiment, the system can provide a first recommendation, then after the user has updated the layout to provide more data about walls, large metal objects, etc, than the system can provide a recommendation based on the additional data input by the user on the layout to either move the AP 102 or to add a mesh node 104. Further, the recommendation will ensure that there is large overlap in the location coverage 501 of the AP 102 and the location coverage 516 of the mesh node 106 so these two can always communicate with each other.

Accordingly, once the layout has been properly reviewed by the user as shown in FIG. 5 then a sample location for the access point 102 can be provided with the recommendation that it be placed on a cabinet 511 or under a cabinet 511 and then the expected range of the access point based on his particular strength signal strength, current use, brand model, frequency, and other characteristics of that particular access point can be projected within the selected dwelling 500. After this coverage is displayed for the user, the user can then make a determination whether or not they wish to have a mesh node added which can also be input to the system and a simulation provided again of the expected coverage of a mesh node, based on the brand and model of the mesh node, its power output, the frequency used, and other characteristics of the mesh node. After these are displayed to the user, the user can confirm that the layout is correct and that the access point can be placed in the desired location and then proceed to place the access point.

A method of carrying out the present application will now be described with respect to FIG. 8. As a first step 802, the user inputs the location of a selected dwelling. Subsequently, the user receives information from the database regarding the selected dwelling in step 804. At this stage, the user may have enough information to request the recommendation of an access point 102 in step 805. If the answer is yes, then the program can advance to step 810, and if the answer is no, then the program advances to step 806 at which additional information is input regarding the dwelling. Further, the user can input additional data, such as photos regarding the selected dwelling in step 808. After all the information is provided, layout is output to the user step 810 for the user to confirm it corresponds to the selected dwelling. The user can then be given an opportunity, in step 812, to provide additional information regarding the dwelling. Step 812 is optional, as is step 808, but will be used in many embodiments. As requested by the user, the location of an access point can be determined as an output in step 814. The location of this access point 102 can be shown on the layout of the dwelling 500 that was provided in step 810 and, if desired, the expected performance can also be shown based on particular brand, strength power output frequency and other characteristics of the particular access point 102 that is expected to be placed in the dwelling in step 816. After viewing the expected performance of the access point step 816, the user can determine whether or not they wish to add a mesh node 104 or make other changes to the desired location of the access point 102. If the expected performance is not acceptable, then additional steps can be taken after step 816, but before step 818 of placing the access point. For example, if the expected performance is not sufficient, the user can perform tests by placing the AP 102 at different locations on the layout and check the expected performance. The user might select a location that ensures high throughput in one room, for example the office or entertainment room, and provide little or no coverage in another room, such as a laundry room, a utility room. If the user wishes, they can test the coverage with a mesh node at a location on the simulated layout shown on the client device 116, an example of which is in FIG. 5, and then place the AP 102 and mesh node 106. After all these factors are taken into account, the user can place the access point at the desired location, which might be the original recommended location or it might be user selected location after viewing the layout and the coverage, step 818.

Figure 8:
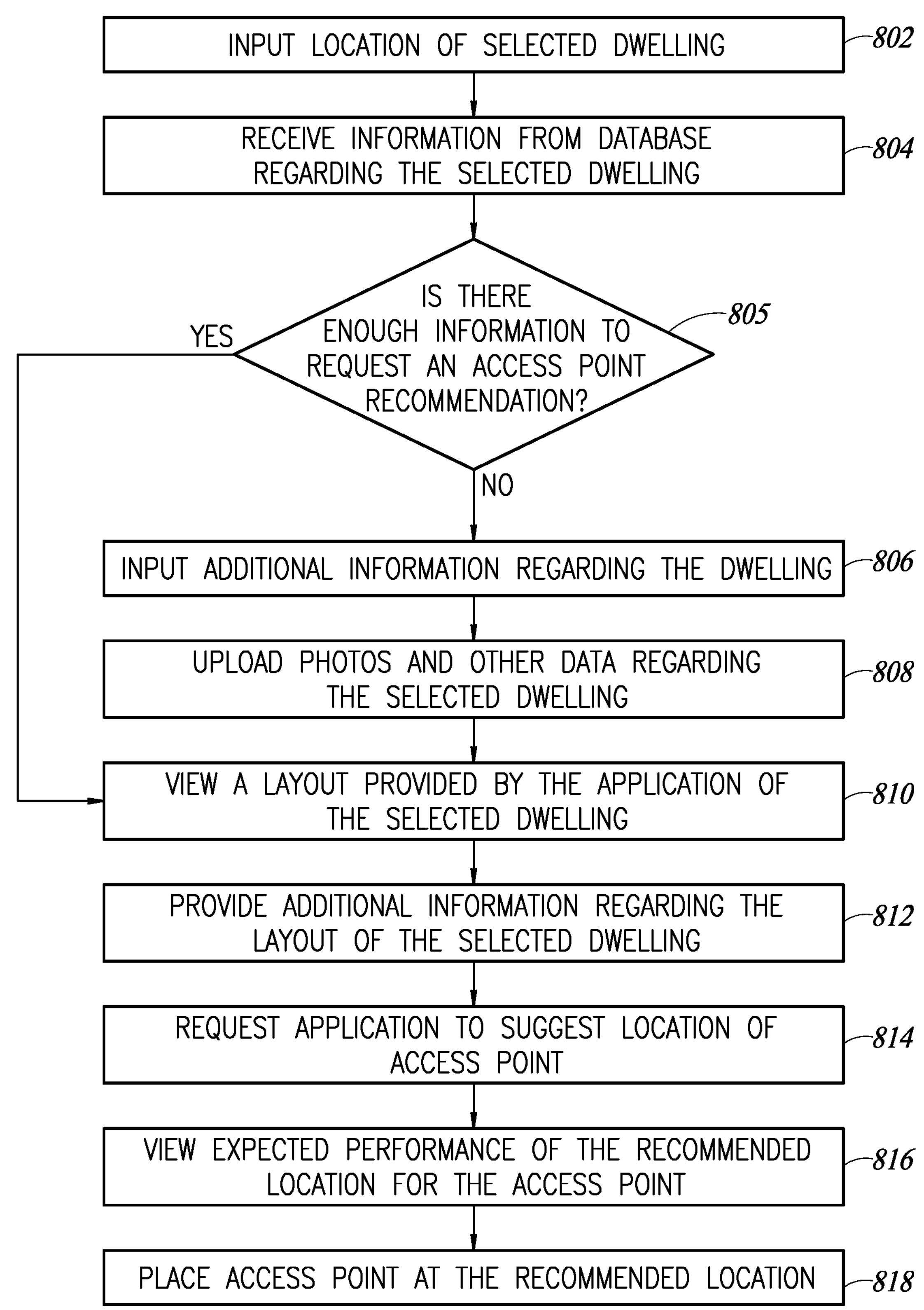
FIG. 8 is a flow chart for selecting a location of an access point in a dwelling.

It is to be noted that not all steps in FIG. 8 need to be performed and do not need to be performed in the sequence shown. For example steps 806, 808, and 812-816 are optional and need not be performed; the user might wish to just place the AP 102 at the recommended location and not go through the many other steps to either save time or because the dwelling is of a size that good performance of the Wi-Fi will occur if properly placed and further refinement is not needed. Similarly, the user may skip step 805 and go directly from step 804 to step 818, with the information provided in step 804 being sufficient to properly place the AP 102. This last sequence might occur if the exact address of the dwelling is already in the database, a preferred AP 102 was previously determined and is provide in step 804 so the user can simply place the AP 102 at the indicated location if one is provided in step 804.

A significant benefit of the present application is a small amount of time used and yet the accuracy for the recommendation of the placement of the access point. This particular application does not require any sensing equipment, the measuring of any data at numerous locations, or the checking of Wi-Fi propagation strength and capabilities throughout the dwelling. Instead, the application, once uploaded onto the user's device can analyze the input address and within a short period of time, usually within minutes or less, can determine whether or not the address is a current match to the system and, if so, output the desired location the access point together with the layout as shown in FIG. 5 or, alternatively, request additional input regarding the dwelling, and after receiving the input, which may include drawings, uploaded photographs, and other data, can then analyze the data and provide a recommendation for the access point. Accordingly, a person with low technical skills and without expensive equipment is able to place the access point 102 at a desired location that will provide optimum Wi-Fi coverage.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus for determining a preferred location for a Wi-Fi access point in a dwelling, the apparatus comprising:

a memory having stored therein dwelling data that includes a layout for a plurality of dwellings and expected Wi-Fi propagation data for each respective dwelling;

a computer processor configured to receive input data from a user regarding a selected dwelling and perform actions comprising:

comparing the input data from the user with dwelling data stored in the memory by a different user, wherein the input data identifies the selected dwelling and the comparing locates dwelling data in the memory for a different dwelling that is similar to the selected dwelling, the dwelling data for the different dwelling comprising a layout corresponding to a layout for the selected dwelling;

outputting results of the comparing of the input data and the dwelling data for the different dwelling for viewing by the user; and outputting a recommended Wi-Fi access point setup location for the selected dwelling in response to the user requesting a recommendation, wherein the recommended Wi-Fi access point setup location is determined using the layout for the different dwelling and expected Wi-Fi propagation data for the layout that are retrieved from the stored dwelling data.

2. The apparatus of claim 1 wherein the stored dwelling data includes a physical address of each dwelling of the plurality of dwellings, and the input data includes a physical address of the selected dwelling.

3. The apparatus of claim 1 wherein outputting results of the comparing of the input data and the dwelling data for the different dwelling for viewing by the user includes outputting a layout of the selected dwelling.

4. The apparatus of claim 1 wherein the stored dwelling data includes simulations of a plurality of potential layouts of dwellings.

5. The apparatus of claim 1 wherein the stored dwelling data includes a simulation of a structure within the selected dwelling.

6. The apparatus of claim 1 wherein the stored dwelling data includes a simulation of a structure outside of the selected dwelling.

7. The apparatus of claim 1 wherein the stored dwelling data includes layouts of multiple different dwellings potentially similar to the selected dwelling.

8. The apparatus of claim 1, further including:

presenting an input menu to the user to input additional data about the selected dwelling.

9. The apparatus of claim 8 wherein the additional data includes at least one of a number of rooms, a number of walls, or a total living area of the selected dwelling.

10. The apparatus of claim 1 wherein the stored dwelling data includes whether the selected dwelling is part of a community of other dwellings having similar layouts.

11. The apparatus of claim 1 wherein the stored dwelling data includes data regarding structures outside of the selected dwelling.

12. The apparatus of claim 1 wherein the input data includes one or more photographs of the selected dwelling that have been taken by a user device.

13. A method of determining a preferred location for a Wi-Fi access point in a dwelling, comprising:

storing dwelling data in a memory, the dwelling data including a layout for a plurality of dwellings and expected Wi-Fi propagation data for each respective dwelling;

receiving, from a user, input data regarding a selected dwelling;

comparing the input data with dwelling data stored in the memory by a different user, wherein the input data identifies the selected dwelling and the comparing locates dwelling data in the memory for a different dwelling that is similar to the selected dwelling, the dwelling data for the different dwelling comprising a layout corresponding to a layout for the selected dwelling;

outputting results of the comparing of the input data and the dwelling data for the different dwelling for display by a user device; and outputting a recommended Wi-Fi access point setup location for the selected dwelling based on the results of the comparing, wherein the recommended Wi-Fi access point setup location is determined using the layout for the different dwelling and expected Wi-Fi propagation data for the layout that are retrieved from the stored dwelling data.

14. The method of claim 13, further including:

generating respective simulations of a plurality of potential layouts of dwellings in the plurality of dwellings.

15. The method of claim 13 wherein the input data includes one or more photographs of an interior of the selected dwelling.

16. The method of claim 13 wherein the user input data includes one or more of:

an address of the selected dwelling;

a number of rooms in the selected dwelling;

square feet of the selected dwelling;

an expected number of client devices using Wi-Fi in the selected dwelling;

a location of a large metal object within the selected dwelling; and a location of a large metal object outside of the selected dwelling.

17. The method of claim 13 wherein outputting results of the comparing of the input data and the dwelling data for the different dwelling for display by the user device includes presenting a sample layout of the selected dwelling.

18. The method of claim 17, further including:

receiving additional input from the user that includes modifications to the sample layout of the selected dwelling.

19. The method of claim 13 wherein the dwelling data includes layouts of multiple different dwellings potentially similar to the selected dwelling.

20. The method of claim 13 wherein the dwelling data includes an indication of whether the selected dwelling is part of a community of other dwellings having similar layouts.

* * * * *